(12) United States Patent
Onishi et al.

(10) Patent No.: US 6,209,522 B1
(45) Date of Patent: Apr. 3, 2001

(54) VARIABLE DELIVERY FUEL SUPPLY DEVICE

(75) Inventors: Yoshihiko Onishi; Masayasu Miyajima, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/593,145

(22) Filed: Jun. 14, 2000

(30) Foreign Application Priority Data

Mar. 1, 2000 (JP) .................................................. 12-55338

(51) Int. Cl.[7] .................................................. F02M 33/04
(52) U.S. Cl. ........................... 123/458; 123/456; 123/506
(58) Field of Search .................. 123/179.16, 179.17, 123/458, 456, 506

(56) References Cited

U.S. PATENT DOCUMENTS

| 5,197,438 | * | 3/1993 | Yamamoto | 123/506 |
| 5,313,924 | * | 5/1994 | Regueiro | 123/458 |
| 5,558,068 | * | 9/1996 | Kunishima et al. | 123/179.17 |
| 6,012,010 | * | 8/2000 | Isozumi et al. | 123/458 |
| 6,024,064 | * | 2/2000 | Kato et al. | 123/179.17 |

FOREIGN PATENT DOCUMENTS 10-176625   6/1998   (JP) .

11-200990   7/1999   (JP) .

* cited by examiner

*Primary Examiner*—Thomas N. Moulis
(74) *Attorney, Agent, or Firm*—Sughrue, Mion, Zinn Macpeak & Seas, PLLC

(57) ABSTRACT

A variable delivery fuel supply device capable of obtaining a stable fuel pressure even in a case of inoperability of an electromagnetic valve and capable of improving the durability of the electromagnetic valve, which comprises fuel injection valves 1*a* through 1*d* for injecting fuel to respective cylinders of an internal combustion engine, a delivery pipe 2 connected with the fuel injection valves 1*a* through 1*d*, a fuel pump 3 which sucks fuel from a fuel intake valve into a pressurizing chamber 23 by a reciprocating action of a plunger 21 in a cylinder 20 and supplies the pressurized fuel into the delivery pipe 2 through a discharge valve 31, an electromagnetic valve 32 located in a relief passage 35 communicating the pressurizing chamber 23 of the fuel pump 32 with the fuel intake port 27 and is adapted to control a discharge quantity of the pressurized fuel by relieving the pressurized fuel in the pressurizing chamber 23 into the fuel intake port 27 at the time of opening the valve to thereby control a fuel pressure in the delivery pipe 2, and a high pressure regulator 19 for controlling a fuel pressure by relieving the pressurized fuel in a high-pressure fuel passage including the delivery pipe 2.

7 Claims, 5 Drawing Sheets

F I G. 1
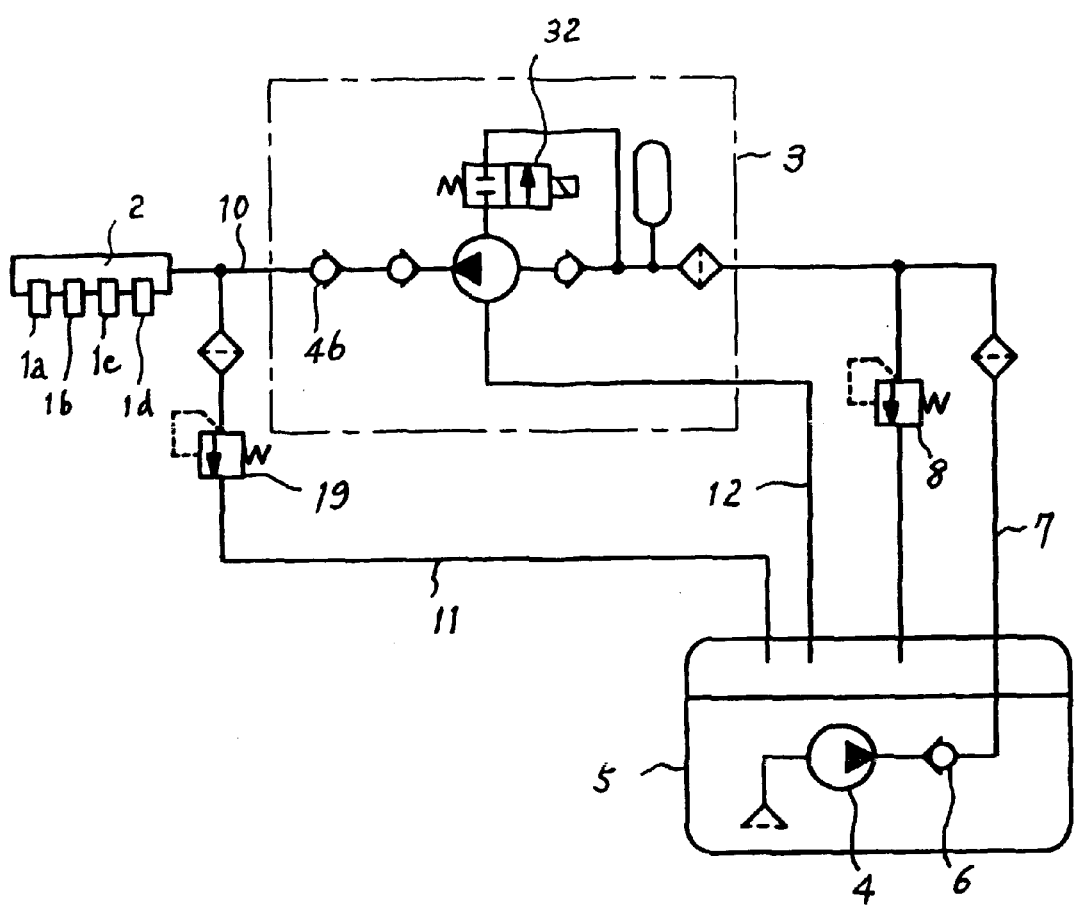

VARIABLE DELIVERY FUEL SUPPLY DEVICE

BACKGROUND OF THE INVENTION

1. Field of the Invention

The present invention relates to a variable delivery fuel supply device which is used for an internal combustion engine for automobiles, in particular, for a cylinder injection type gasoline engine requiring highly pressurized fuel and which is capable of controlling an amount of fuel to be supplied to fuel injection valves.

2. Discussion of Background

FIG. 7 is a systematic diagram showing the construction of a conventional variable delivery fuel supply device, and FIG. 8 is a cross-sectional view of a relief valve used for the conventional delivery fuel supply device.

The systematic diagram of FIG. 7 is disclosed, for instance, in JP-A-11-200990. In FIG. 7, reference numerals 1a through 1d designate fuel injection valves for injecting fuel into respective cylinders of an internal combustion engine, numeral 2 designates a delivery pipe for supplying fuel to the fuel injection valves, numeral 3 a fuel pump for supplying pressurized fuel to the delivery pipe 2, numeral 4 a low pressure pump for supplying fuel from a fuel tank 5 to the fuel pump 3, numeral 6 a check valve provided in a fuel passage 7, numeral 8 a low pressure regulator for controlling pressure in the fuel passage 7, numeral 9 a relief valve for relieving fuel from a fuel passage 10 through a fuel passage 11 to the fuel tank 5 when a fuel pressure in the delivery pipe 2 exceeds a predetermined value, and numeral 12 a return passage for returning fuel through the fuel pump 3 to the fuel tank 5.

The fuel pump 3 comprises a cylinder, a plunger which sucks fuel at a suction step to feed it into a pressurizing chamber by performing a reciprocating movement in the cylinder due to a driving action of a driving cam provided on a cam shaft of the internal combustion engine and supplies forcibly fuel pressurized in the pressurizing chamber at a discharge step, and an electromagnetic valve for controlling a quantity of fuel discharged from the pressurizing chamber by relieving the pressurized fuel in the pressurizing chamber to a low pressure side at a predetermined timing, whereby control to a fuel pressure in the delivery pipe 2 is conducted so as to provide a predetermined pressure value, although these structural components are not shown in the drawing.

For the relief valve 9 for relieving fuel from the delivery pipe 2 to the fuel tank 5 when a fuel pressure exceeds a predetermined value, the relief valve as shown in FIG. 8 is generally used. The relief valve 9 in FIG. 8 comprises a housing 15 having a connecting port 13 at a high pressure side and a connecting port 14 at a low pressure side, a valve 16, a valve seat 17 and a spring 18 which usually urges the valve 16 toward the valve seat 17 to make a closing state. In a normal condition of use, a fuel pressure in the delivery pipe 2 is controlled by the electromagnetic valve. Since the relief valve 9 relieves fuel in the delivery pipe 2 only when a fuel pressure in the delivery pipe 2 is in an abnormal state, a check valve of small relief capacity is used.

In the conventional variable fuel supply device having the construction described above, when a starting operation is conducted to the internal combustion engine, the low pressure pump 4 is actuated so that fuel is supplied from the fuel tank 5 to the fuel pump 3, and the fuel pump 3 is driven by the internal combustion engine, whereby the fuel pump 3 sucks fuel into the pressurizing chamber at a suction step of the plunger and supplies forcibly pressurized fuel through the fuel passage 10 to the delivery pipe 2 at a discharge step. In a normal operating condition, a fuel pressure in the delivery pipe 2 is controlled by the electromagnetic valve located in the fuel pump 3 to have a predetermined pressure value. However, since there is a limit in the response characteristics of the electromagnetic valve, a fuel pressure in the delivery pipe 2 may increase abnormally depending on operational conditions of the internal combustion engine. In such case, the relief valve 9 is actuated to relieve fuel so that breakage of a high-pressure fuel passage such as the delivery pipe 2, the fuel passage 10 or the like can be prevented.

Although the above-mentioned conventional variable fuel supply device achieved a stable control of fuel pressure in a normal operating condition, there was a case that for example, when the electromagnetic valve became faulty such as inoperability of fuel pressure control, an amount of fuel which exceeds the limit of the capacity of the relief valve 9 might be supplied from the fuel pump 3 to the delivery pipe 2. This caused an abnormal increase of fuel pressure in the high-pressure fuel passage such as the delivery pipe 2, whereby structural elements constituting the high-pressure fuel passage might be broken. Further, even when the electromagnetic valve correctly operated, there was difficulty in estimating practically a fuel pressure in the delivery pipe 2 or the fuel pump in a course of raising a fuel pressure in the delivery pipe 2 to a predetermined pressure value at the time, for instance, of the starting of the internal combustion engine. In such case, when the electromagnetic valve was actuated, a fuel pressure in the delivery pipe 2 sometimes became unstable.

The electromagnetic valve performs normally relieving operations at each step of the operations of fuel pump. Since it operates continuously during the operations of the internal combustion engine, the frequency of operation is extremely high. Therefore, occurrence of a defect such as inoperability of fuel pressure control due to, for instance, the wearing of a constitutional element is unavoidable. When such defect occurs, an amount of fuel which is beyond the limit of the performance of the relief valve 9 is supplied in a high-rotational region of the fuel pump, and the fuel pressure abnormally rises, whereby the high-pressure passage such as the delivery pipe 2 may be broken. In order to eliminate such defect and improve the durability of the electromagnetic valve, it is an effective way to decrease the operational frequency of the electromagnetic valve.

SUMMARY OF THE INVENTION

It is an object of the present invention to provide a variable delivery fuel supply device capable of providing a stable fuel pressure irrespective of the response characteristics of the electromagnetic valve, or even in a case of inoperability of the electromagnetic valve.

It is an object of the present invention to provide a variable delivery fuel supply device capable of improving the durability of the electromagnetic valve.

In accordance with the present invention, there is provided a variable delivery fuel supply device which comprises fuel injection valves for injecting fuel to respective cylinders of an internal combustion engine, a delivery pipe for supplying pressurized fuel into the fuel injection valves, a fuel pump which sucks fuel from a fuel intake port through an intake valve into a pressurizing chamber by a reciprocating action of a plunger in a cylinder and supplies the pressurized fuel into the delivery pipe through a discharge valve, an electromagnetic valve located in a relief passage communicating the pressurizing chamber of the fuel pump with the fuel intake port and is adapted to control a discharge quantity of the pressurized fuel by relieving the pressurized fuel in the pressurizing chamber into the fuel intake port at the time of opening the valve to thereby control a fuel pressure in the delivery pipe, control means capable of supplying a valve-opening signal to the electromagnetic valve and a high pressure regulator for controlling a fuel pressure by relieving the pressurized fuel in a high-pressure fuel passage including the delivery pipe.

In the above-mentioned invention, the high pressure regulator is constructed so as to relieve at least an amount of fuel which corresponds to the maximum discharge value of the fuel pump.

Further, according to the present invention, the high pressure regulator is formed integrally with the fuel pump.

Further, according to the present invention, the control means generate no valve-opening signal in a region of rotation of the internal combustion engine where control to the fuel pressure by the electromagnetic valve becomes unstable.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 1 is a systematic diagram showing the construction of the variable delivery fuel supply device according to a first embodiment of the present invention;

DETAILED DESCRIPTION OF PREFERRED EMBODIMENT

Figure 2:
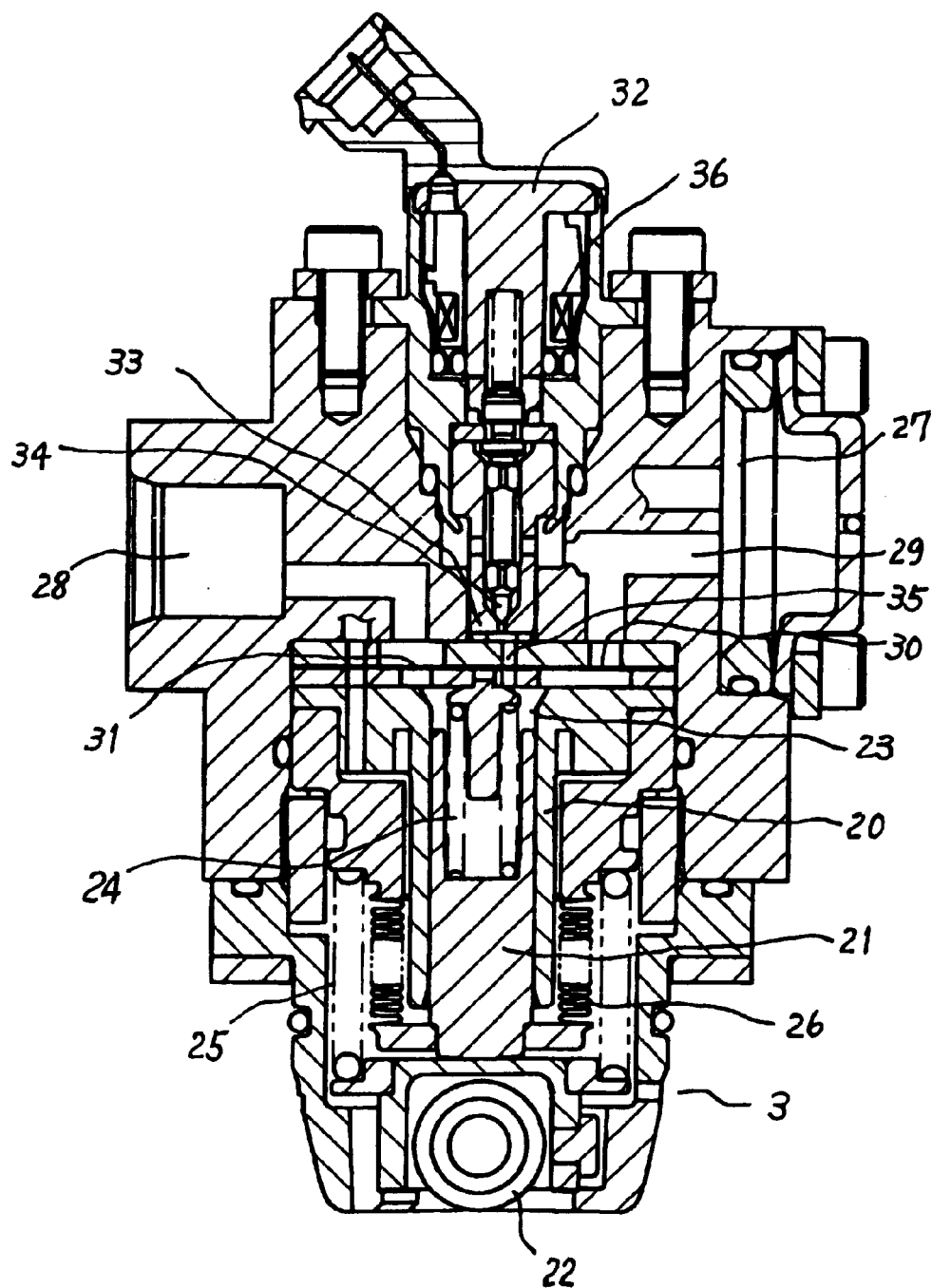
FIG. 2 is a cross-sectional view of a fuel pump used for the variable delivery fuel supply device of the first embodiment of the present invention.

The variable delivery fuel supply device according to a first embodiment of the present invention will be described with reference to FIGS. 1 to 3 wherein the same reference numerals designate the same or corresponding parts.

Embodiment 1

In FIG. 1, reference numerals 1a through 1d designate fuel injection valves for injecting fuel to the respective cylinders in an internal combustion engine, numeral 2 designates a delivery pipe which receives pressurized fuel and supplies the fuel to the fuel injection valves 1a–1d, numeral 3 a fuel pump for supplying pressurized fuel into the delivery pipe 2 through a fuel passage 10, numeral 4 a low pressure pump for supplying fuel from a fuel tank 5 through a fuel passage 7 to the fuel pump 3, numeral 6 a check valve provided in the fuel passage 7 to prevent fuel from flowing in a reverse direction, numeral 8 a low pressure regulator for controlling a pressure in the fuel passage 7, numeral 12 a return passage to return fuel from the fuel pump 3 to the fuel tank 5, and numeral 19 a high pressure regulator which is located in a high-pressure fuel passage such as the delivery pipe 2 and the fuel passage 10 and is so adapted as to relieve fuel to the fuel tank 5 through a fuel passage 11 when the fuel pressure of the high-pressure fuel passage exceeds a predetermined value.

In the fuel pump 3 shown in FIG. 2, reference numeral 20 designates a cylinder, numeral 21 a plunger which performs a reciprocating movement in the cylinder 20 to suck fuel into a pressurizing chamber 23 in which the sucked fuel is pressurized, wherein the plunger is driven by a driving cam of a cam shaft (although they are not shown in FIG. 2) via a roller 22, numeral 24 a spring for urging always the plunger 21 in a direction of expanding the pressurizing chamber 23, numeral 25 a spring for urging the roller 22 toward a side of the cam shaft(not shown), numeral 26 a bellows made of metal which is for sealing fuel possibly leaking from a gap between the cylinder 20 and the plunger 21, numeral 27 a fuel intake port into which fuel is supplied from the fuel tank 5, and numeral 28 a fuel discharge port connected to the delivery pipe 2 by means of the fuel passage 10. The fuel intake port 27 is communicated with the pressurizing chamber 23 through a fuel intake passage 29 and an intake valve 30, and the fuel discharge port 28 is communicated with the pressurizing chamber 23 through a discharge valve 31.

For the driving cam, a multi-ridge type cam having, for instance, 4 ridges, 5 ridges or 6 ridges is used in order to reduce the occurrence of a pulse-like fuel pressure in the delivery pipe 2. Accordingly, reed valves having high response characteristics are used for the intake valve 30 and the discharge valve 31.

Reference numeral 32 designates an electromagnetic valve which is normally closed, but is opened when a valve-opening signal is given to it from control means(not shown). The electromagnetic valve 32 is provided with a valve unit comprising a valve 33 and a valve seat 34, which is so adapted to open and close a relief passage 35 communicated with the pressurizing chamber 23 and the fuel intake passage 29. When the electromagnetic valve 32 is opened, fuel pressurized in the pressurizing chamber 23 flows through the relief passage 35 to the fuel intake passage 29. The fuel pump 3 is driven by a cam for driving the pump, which is provided on a cam shaft in the internal combustion engine, and pressurizes fuel with the rotation of the engine to supply forcibly the fuel to the delivery pipe 2. The control means (not shown) detects a fuel pressure in the delivery pipe 2 and gives a valve-opening signal to an exciting coil 36 of the electromagnetic valve 32. Then, the electromagnetic valve 32 is opened whereby the pressurized fuel in the pressurizing chamber 23 is fed through the relief passage 35 to the fuel intake passage 29.

Figure 3:
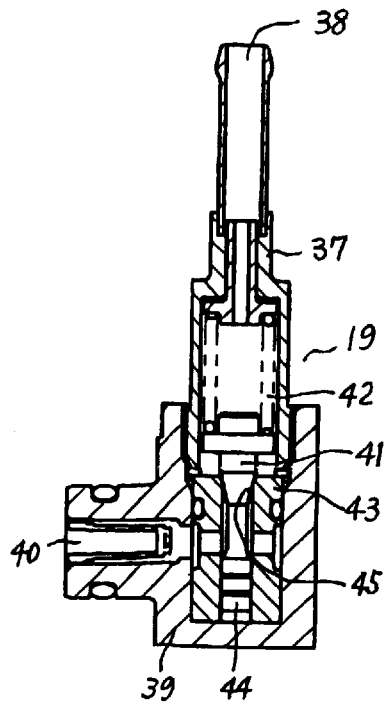
FIG. 3 is a cross-sectional view of a high pressure regulator used for the variable delivery fuel supply device of the first embodiment of the present invention.

In the high pressure regulator 19 shown in FIG. 3, reference numeral 37 designates a first housing having a discharge port 38 and numeral 39 a second housing having a high-pressure fuel introducing port 40. The first housing 37 accommodates a valve 41 and a spring 42 and the second housing 39 accommodates a valve seat 43 which forms a valve in association with the valve 41, wherein the spring 42 applies an urging force to the valve 41 to contact the valve seat 43, and the spring separates the valve 41 when a pressure in the delivery pipe 2, which exceeds a predetermined pressure, is applied to the high-pressure fuel introducing port 40. Reference numeral 44 designates a damper which absorbs a shock by the valve 41 and prevents the generation of noises caused by the movement of the valve. The valve seat 43 is provided with a valve opening 45 having an aperture sufficient to relieve an amount of fuel which corresponds to the maximum discharge value of the fuel pump 3 when the valve 41 is separated from the valve seat 43.

In the operation of the variable delivery fuel supply device according to the first embodiment of the present invention, the low pressure pump 4 is actuated as soon as the starting of the internal combustion engine, and fuel is supplied from the fuel tank 5 to the fuel pump 3. When the fuel pump 3 is driven by the internal combustion engine, the discharge valve 31 is closed and the intake valve 30 is opened at a suction step of the plunger 21 whereby fuel is sucked into the pressurizing chamber 23 through the fuel intake port 27 and the fuel intake passage 29, and at a discharge step of the plunger 21, the intake valve 30 is closed and the discharge valve 31 is opened whereby pressurized fuel is supplied forcibly to the delivery pipe 2 via the fuel discharge port 28 and the fuel passage 10. When the engine is stopped, the fuel pressure in the fuel pump 3 will decrease. However, a fuel pressure maintaining valve 46 is provided in the fuel passage 10 in this embodiment, and therefore, the fuel pressure in the delivery pipe 2 can be maintained for a predetermined time by closing the fuel pressure maintaining valve 46.

A reciprocating movement of the plunger 21 is in synchronism with a rotating speed of the internal combustion engine. As the rotating speed of the internal combustion engine is increased, the speed of the reciprocating movement is increased, and the discharge performance of the fuel pump 3 is increased. When a fuel pressure in the delivery pipe 2 increases to a predetermined pressure value just after the starting of the internal combustion engine, it is difficult to estimate actually a fuel pressure in the delivery pipe 2 and the pressurizing chamber 23 of the fuel pump. In this case, if the electromagnetic valve 32 is actuated, a fuel pressure in the delivery pipe 2 indicates an unstable behavior.

The variable delivery fuel supply device of the first embodiment of the present invention can be constructed in such a manner that the supply of a valve-opening signal to the electromagnetic valve 32 is stopped until the rotation of the internal combustion engine becomes stable and the operation of the electromagnetic valve 32 becomes stable; a fuel pressure in the delivery pipe 2 is controlled by the high pressure regulator 19, and the supply of the valve-opening signal to the electromagnetic valve 32 is restarted when the rotating speed of the internal combustion engine reaches, for instance, an idling speed which may provide a stable condition of rotation. Thus, a stable control to the fuel pressure can be obtained even just after the starting of the engine.

Further, there is a case that when the internal combustion engine is operated at a high speed, the frequency of the valve-opening signal given to the electromagnetic valve 32 becomes high as the rotating speed is increased. This may cause that the electromagnetic valve 32 can not respond quickly to the valve-opening signal at a rotating speed, whereby a fuel pressure in the delivery pipe 2 becomes unstable and indicates an abnormal increase. In coping with this, the supply of the valve-opening signal to the electromagnetic valve 32 is stopped when the rotating speed of the internal combustion engine exceeds a predetermined value, and a fuel pressure in the delivery pipe 2 is controlled by the high pressure regulator 19. Thus, in this embodiment of the present invention, the fuel pressure is controlled by the electromagnetic valve 32 in a rotational speed range from an idling rotation to a regularly used rotation, and the fuel pressure is controlled by the high pressure regulator 19 at the time just after the starting of the engine or during a high speed rotation. Accordingly, it is possible to obtain a stable fuel pressure over the entire rotational speed range of the engine.

As described above, in the first embodiment of the present invention, the high pressure regulator 19, which is capable of relieving an amount of fuel corresponding to at least the maximum discharge value of the fuel pump 3, is provided in the high-pressure fuel passage including the delivery pipe 2. Accordingly, the role of control to a fuel pressure in a rotational speed range of the internal combustion engine in which control by the electromagnetic valve becomes unstable can be imposed on the high pressure regulator 19. With such arrangement, the fuel pressure can stably be controlled in the entire rotational region; a burden to the electromagnetic valve 32 can be reduced, and the service life of the electromagnetic valve 32 can be elongated. Further, even though a defect such as uncontrollability occurs in the electromagnetic valve 32, a continuous operation is possible without causing the breakage of a structural element of the high-pressure fuel passage. Further, the operation of the internal combustion engine at a high speed, which was conventionally difficult due to a limit in the response characteristics of the electromagnetic valve, can be achieved.

Embodiment 2

The variable delivery fuel supply device according to a second embodiment of the present invention will be described with reference to FIGS. 4 to 6 wherein the same reference numerals designate the same or corresponding parts.

Figure 4:
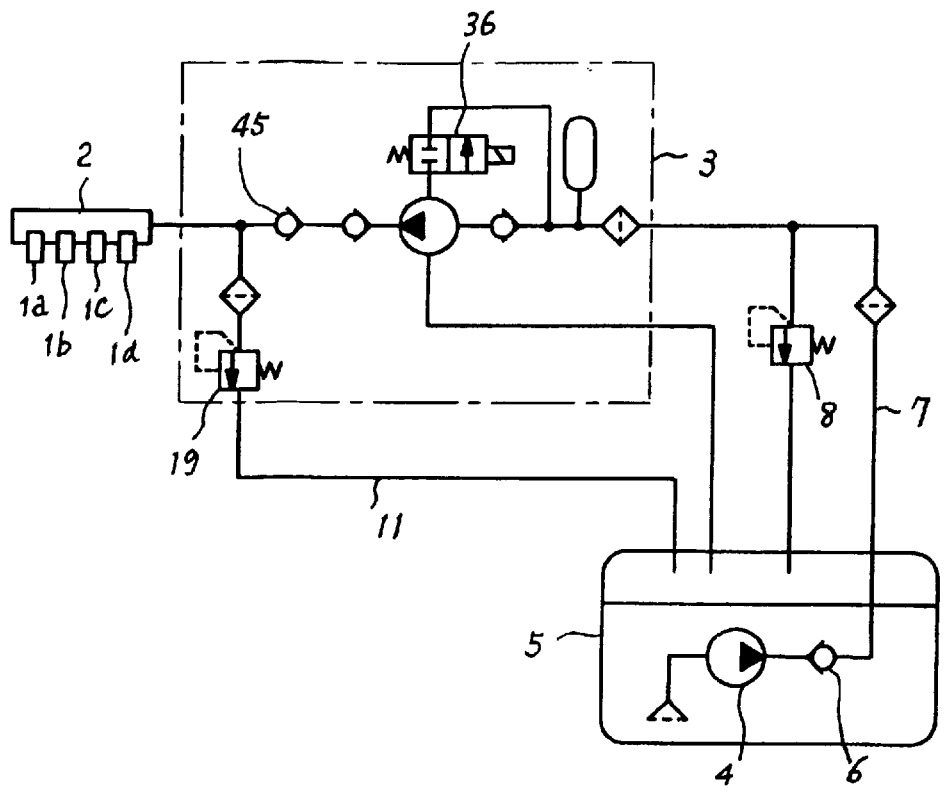
FIG. 4 is a systematic diagram showing the variable delivery fuel supply device according to a second embodiment of the present invention.

The construction of the second embodiment is the same as that of the first embodiment shown in FIG. 1 except that the high pressure regulator 19 is assembled integrally with the fuel pump 3 wherein FIG. 4 shows that the high pressure regulator 19 is depicted in a frame showing the fuel pump 3.

Figure 5:
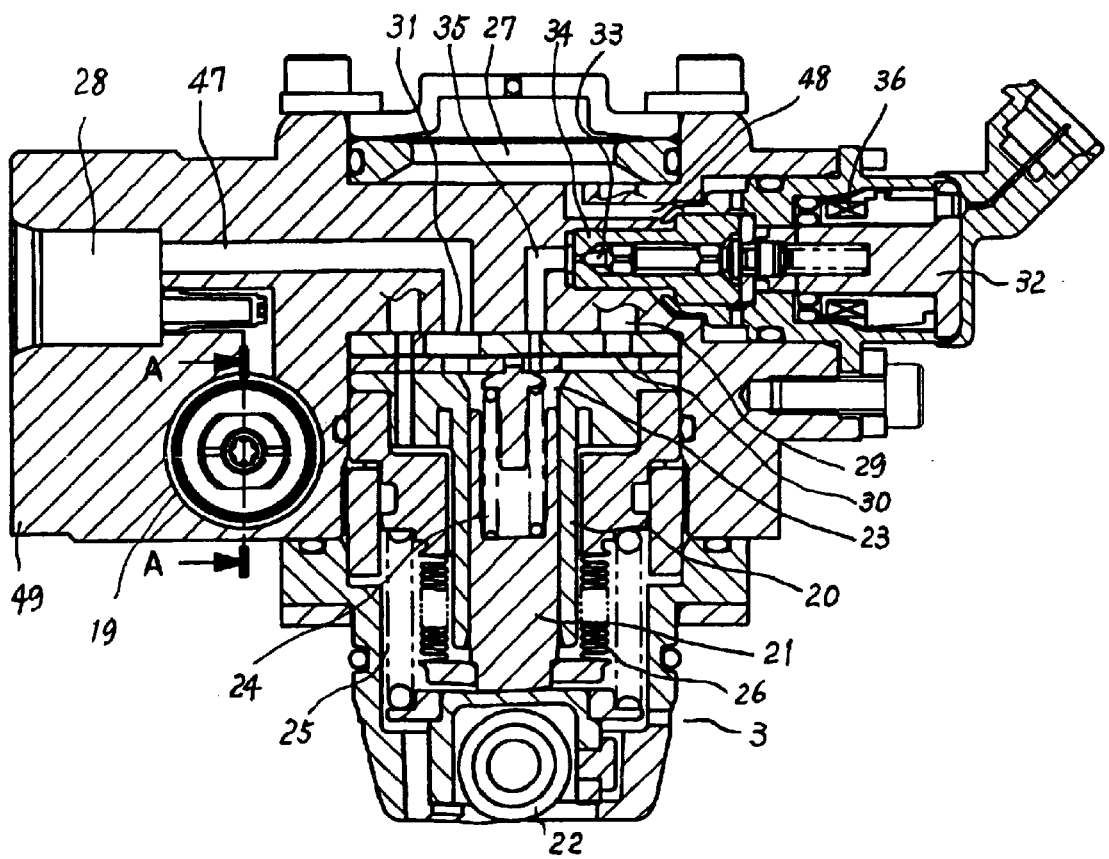
FIG. 5 is a cross-sectional view of a fuel pump used for the variable delivery fuel supply device of the second embodiment of the present invention.
Figure 6:
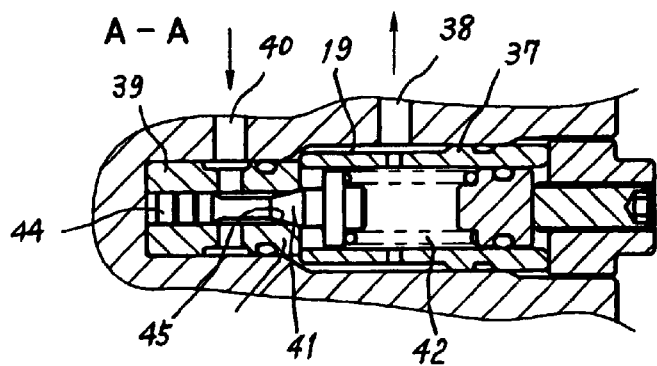
FIG. 6 is a cross-sectional view taken along a line A—A in FIG. 5.
Figure 7:
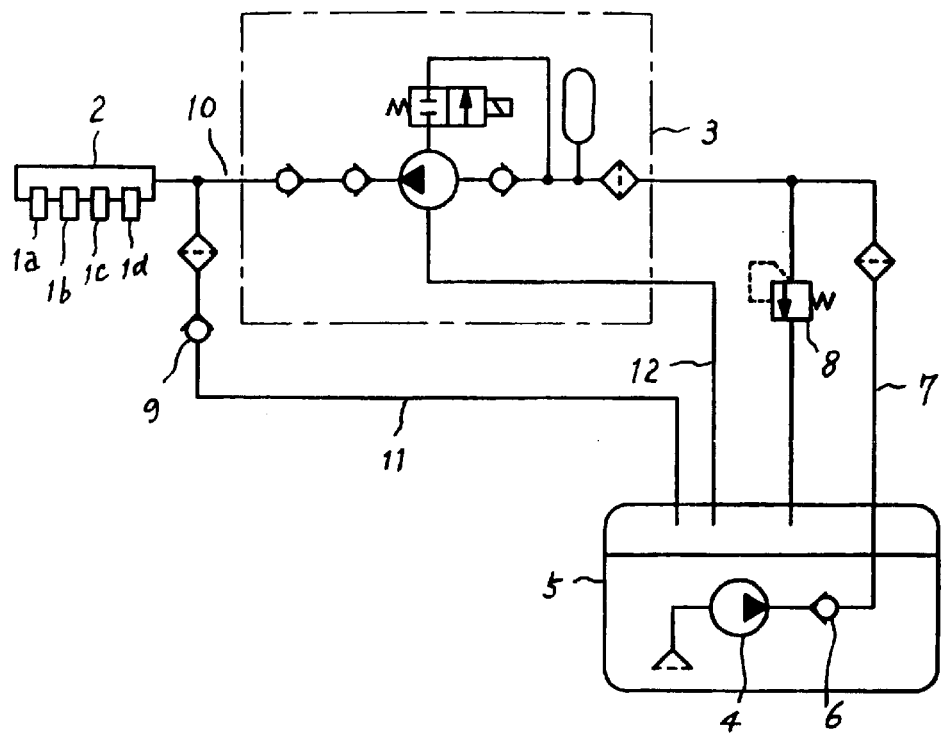
FIG. 7 is a systematic diagram showing the construction of a conventional variable delivery fuel supply device.
Figure 8:
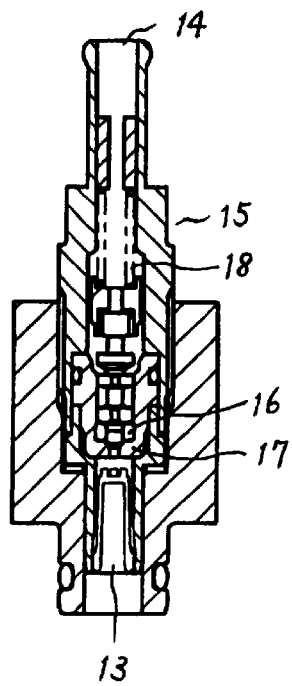
FIG. 8 is a cross-sectional view of a relief valve used for the conventional variable delivery fuel supply device.

In the fuel pump 3 shown in FIG. 5, reference numeral 20 designates a cylinder, numeral 21 a plunger 21, numeral 22 a roller, numeral 23 a pressurizing chamber, numeral 24 a spring for urging the plunger, numeral 25 a spring for urging the roller 22, and numeral 26 a bellows made of metal. These structural elements are the same as those of the first embodiment shown in FIG. 2. Numeral 27 designates a fuel intake port through which fuel is supplied from the fuel tank 5, and numeral 28 a fuel discharge port connected to the delivery pipe 2 by means of the fuel passage 10. The fuel intake port 27 is communicated with the pressurizing chamber 23 via a fuel intake passage 29 and an intake valve 30, and the fuel discharge port 28 is communicated with the pressurizing chamber 23 via a discharge passage 47 and a discharge valve 31.

Reference numeral 32 designates a normally closing type electromagnetic valve which is provided with a valve unit comprising a valve 33 and a valve seat 34 and is so adapted to open and close relief passages 35 and 48 communicated with the pressurizing chamber 23 and the fuel intake port 27. When the electromagnetic valve 32 is opened, fuel pressurized in the pressurizing chamber 23 is fed through the relief passages 35, 48 to the fuel intake port 27. Reference numeral 19 designates a high pressure regulator 19 assembled in a housing 49 for the fuel pump 3, which comprises a first housing 37 having a discharge port 38 and a second housing 39 having a high-pressure fuel introducing port 40. The first housing 37 accommodates a valve 41 and a spring 42 and the second housing 39 accommodates a valve seat 43 and a damper 44. The valve seat 43 is provided with a valve opening 45 having an aperture sufficient to relieve an amount of fuel which corresponds to the maximum discharge value of the fuel pump 3 when the valve 41 is separated from the valve seat 43, in the same manner as the first embodiment.

The variable delivery fuel supply device of the second embodiment wherein the high pressure regulator 19 is assembled integrally in the housing 49 of the fuel pump 3 performs the same function as the first embodiment. Further, the second embodiment can reduce the number of structural elements and can improve mounting properties to the internal combustion engine.

Thus, in accordance with the present invention, the fuel pressure can stably be controlled in the entire rotational region of the internal combustion engine; the burden of the electromagnetic valve can be reduced so that the service life of it can be prolonged; there is a little possibility of causing the breakage of a structural element of the high pressure fuel passage even when a defect such as non-controllability occurs in the electromagnetic valve whereby a continuous operation can be realized; a high-speed operation of the internal combustion engine is possible regardless of the response characteristics of the electromagnetic valve; and a variable delivery fuel supply device having excellent mounting properties is obtainable.

Further, in the conventional device, it was necessary to increase the response properties of the electromagnetic valve in order to broaden a working frequency range of the fuel pump, which invited an increase of manufacturing cost. However, in the present invention, the working frequency range of the fuel pump can be broaden with a low cost because it can be achieved without changing the specification of the electromagnetic valve.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application JP2000-55338 filed on Mar. 1, 2000 including specification, claims, drawings and summary are incorporated herein by reference in its entirety.

What is claimed is:

1. A variable delivery fuel supply device which comprises:
   fuel injection valves for injecting fuel to respective cylinders of an internal combustion engine, a delivery pipe for supplying pressurized fuel into the fuel injection valves,
   a fuel pump which sucks fuel from a fuel intake port through an intake valve into a pressurizing chamber by a reciprocating action of a plunger in a cylinder and supplies the pressurized fuel into the delivery pipe through a discharge valve,
   an electromagnetic valve located in a relief passage communicating the pressurizing chamber of the fuel pump with the fuel intake port and is adapted to control a discharge quantity of the pressurized fuel by relieving the pressurized fuel in the pressurizing chamber into the fuel intake port at the time of opening the valve to thereby control a fuel pressure in the delivery pipe,
   control means capable of supplying a valve-opening signal to the electromagnetic valve, and
   a high pressure regulator for controlling a fuel pressure by relieving the pressurized fuel in a high-pressure fuel passage including the delivery pipe.

2. The variable delivery fuel supply device according to claim 1, wherein the high pressure regulator is constructed so as to relieve at least an amount of fuel which corresponds to the maximum discharge value of the fuel pump.

3. The variable delivery fuel supply device according to claim 1, wherein the high pressure regulator is formed integrally with the fuel pump.

4. The variable delivery fuel supply device according to claim 2, wherein the high pressure regulator is formed integrally with the fuel pump.

5. The variable delivery fuel supply device according to claim 1, wherein the control means generates no valve-opening signal in a region of rotation of the internal combustion engine where control to the fuel pressure by the electromagnetic valve becomes unstable.

6. The variable delivery fuel supply device according to claim 2, wherein the control means generates no valve-opening signal in a region of rotation of the internal combustion engine where control to the fuel pressure by the electromagnetic valve becomes unstable.

7. The variable delivery fuel supply device according to claim 3, wherein the control means generates no valve-opening signal in a region of rotation of the internal combustion engine where control to the fuel pressure by the electromagnetic valve becomes unstable.

\* \* \* \* \*